US000001054H

United States Statutory Invention Registration [19]

[11] Reg. Number: H1054

Walker, Jr. [43] Published: May 5, 1992

[54] ELECTROCHEMICAL CELL THAT DELIVERS HIGH POWER PULSES

[75] Inventor: Charles W. Walker, Jr., Neptune, N.J.

[73] Assignee: The United States of America as represented by the Secretary of the Army, Washington, D.C.

[21] Appl. No.: 715,265

[22] Filed: Jun. 14, 1991

[51] Int. Cl.[5] ..... H01M 6/14

[52] U.S. Cl. ..... 429/194; 429/218

[58] Field of Search ..... 429/213, 212, 197, 196, 429/194

[56] References Cited

U.S. PATENT DOCUMENTS

| | | | |
|---|---|---|---|
| 4,472,488 | 9/1984 | Maxfield et al. | 429/213 |
| 4,543,306 | 9/1985 | Dubois et al. | 429/213 X |
| 4,547,441 | 10/1985 | Vallin et al. | 429/196 |
| 4,556,617 | 12/1985 | Kruger | 429/196 |
| 4,772,517 | 9/1988 | Muenstedt et al. | 429/213 X |
| 4,803,138 | 2/1989 | Kobayashi et al. | 429/194 |
| 4,816,359 | 3/1989 | Nagele et al. | 429/213 |
| 4,957,833 | 9/1990 | Daifuku et al. | 429/197 |
| 4,987,042 | 1/1991 | Jenas et al. | 429/213 |

*Primary Examiner*—Brooks H. Hunt
*Assistant Examiner*—Daniel Jenkins
*Attorney, Agent, or Firm*—Michael Zelenka; Roy E. Gordon

[57] ABSTRACT

An electrochemical cell is provided that delivers high power pulses, the cell including poly 3-methylthiophene as the cathode, a member of the group consisting of $Li(SO_2)_3AlCl_4$, 1.0M $LiAlCl_4$—$SOCl_2$ and 1.0M $LiAlCl_4$—$SO_2Cl_2$ as the electrolyte, and lithium as the anode.

6 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

1.4μm PMT IN SO2 | SOCl2 | SO2Cl2
DISCHARGED AT 20 mA/cm2

ELECTROCHEMICAL CELL THAT DELIVERS HIGH POWER PULSES

GOVERNMENT INTEREST

The invention described herein may be manufactured, used, and licensed by or for the Government for governmental purposes without the payment to me of any royalty thereon.

FIELD OF INVENTION

This invention relates in general to an electrochemical cell that delivers high power pulses and in particular to such a cell that includes poly 3-methylthiophene, PMT as the cathode, a member of the group consisting of $Li(SO_2)_3AlCl_4$, 1.0M $LiAlCl_4$—$SOCl_2$, and 1.0 M $LiAlCl_4$—$SO_2Cl_2$ as the electrolyte, and lithium as the anode.

BACKGROUND OF THE INVENTION

There has been interest in high voltage lithium electrochemical cells for pulse power reserve cells as well as for pulse applications. Heretofore, this need has been met by the use of porous carbon cathodes. This has not been entirely satisfactory because pulse power is derived predominantly at the electrode surface rather than from the interior bulk. Thus, thin polymer electrodes would be more efficient than the porous carbon cathodes since there is more surface area and less wasted interior space per unit volume in the case of the thin polymer electrodes.

SUMMARY OF THE INVENTION

The general object of this invention is to provide an electrochemical cell capable of delivering high power pulses. A more specific object of the invention is to provide a lithium electrochemical cell able to deliver high power pulses over seconds or minutes with volumetric power density exceeding porous carbon cathode technology.

It has now been found that the aforementioned objects can be attained by providing an electrochemical cell including PMT as the cathode, a member of the group consisting of $Li(SO_2)_3AlCl_4$, 1.0 M $LiAlCl_4$—$SOCl_2$ and 1.0 M $LiAlCl_4$—$SO_2Cl_2$ as the electrolyte, and lithium as the anode.

Thin films of PMT can be easily polymerized electrochemically, controlling film thickness by the number of coulombs of charge passed. When reduced (undoped), PMT is electrically insulating, but in the doped state, has an electrical conductivity in the range of 10–2000 S $cm^{-1}$ depending on the method of preparation and dopant anion. Controlling polymerization electrochemically allows fabrication of conductive films that are much thinner than cathodes prepared, for example, with Teflon-bonded porous carbon. The polymer films can be pulse discharged in $Li(SO_2)_3AlCl_4$,1$_M$$LiAlCl_4$—$SOCl_2$ and 1.0 M $LiAlCl_4$—$SO_2Cl_2$ electrolytes to yield very high volumetric power densities. Power levels per $cm^3$ of polymer cathode are substantially higher than for Teflon bonded porous carbon cathodes.

Thus, according to the invention, thin, electrically conducting PMT films are formed electrochemically and used as cathodes in electrochemical cells. The pulse power capabilities of 1.4 μm thick PMT films discharged in $Li(SO_2)_3AlCl_4$, 1.0 M $LiAlCl_4$—$SO_2Cl_2$ and 1.0 M $LiAlCl_4$—$SOCl_2$ are determined. A volumetric power density (for PMT) of 600 W $cm^{-3}$ is sustained for 30 seconds at an operating potential of about 3.0 V in both thionyl chloride ($SOCl_2$) and sulfuryl chloride ($SO_2Cl_2$). A power density of 429 W $cm^{-3}$ is sustained for 2 minutes (operating at approximately 3.0 V) when PMT is discharged in $SOCl_2$. Power densities are less in the sulfur dioxide based electrolyte, but the PMT cathode is able to be discharged and recharged for many cycles. Multiple 4 second pulses in the $SO_2$ electrolyte averaging about 300 W cm are reproducible over many cycles.

According to the invention, polymer cathode is obtainable that is electrically conductive and able to be tailored to any desired thickness by the amount of charge passed during electropolymerization. Thicknesses on the order of one micron are easily fabricated, whereas Teflon-bonded porous carbon cathodes are necessarily much thicker.

Moreover, one can discharge PMT at high power levels (and high operating voltage) in inorganic electrolytes containing $SO_2$, $SOCl_2$, and $SO_2Cl_2$.

Then too, power densities are obtainable that are much higher than for (thicker) porous carbon cathodes. Power densities of 600 W $cm^{-3}$ can be sustained for at least 30 seconds at a 3.0 V operating potential.

In $Li(SO_2)_3AlCl_4$ electrolyte, multiple four second constant current pulses can be performed at a power density of approximately 500 W $cm^{-3}$. The cell is then able to be recharged and reproducibly pulse discharged for many cycles.

Even higher power can probably be obtained by preparing PMT by another method to increase surface area, or through the use of other high surface area polymers. Given the ease with which thin, electrochemically-formed films can be prepared, it should be possible to construct bipolar cells capable of delivering high power pulses.

Polymerization of PMT can be carried out in a 125 ml European flask (Ace Glass) using a 1 $cm^2$ platinum flag counter electrode, a SSCE reference electrode, and a platinum or glassy carbon rod working electrode. Glassy carbon and platinum rods (0.071 $cm^2$ cross section) are polished to a mirror finish with a 0.1 micron alumina/water paste. The rod is sheathed in heat shrinkable Teflon so as to expose only the cross sectional area at the end of the rod. The cell is flooded with electrolyte containing 0.1 M 3-methylthiophene monomer (Sigma Chemical, 99+%) and 0.1 M tetrabutylammonium tetrafluoroborate (Alpha), with redistilled acetonitrile (Fisher) as the solvent. Ultra high purity dry argon is bubbled through the electrolyte to remove oxygen.

Adherent films, 1.4 μm thick (measured by SEM), are fabricated at 10 mA $cm^{-2}$ by a pulse deposition process, where 0.25 C $cm^{-2}$ is passed in five cycles with five minute rest periods (at open circuit) between cycles. The PMT-coated rod is then rinsed in acetonitrile and dried under vacuum at 50° C. To a first approximation (assuming 100% plating efficiency), a maximum of $4.52\times10^{-5}$ g of 3-methylthiophene is deposited on the substrate. Based on the cross-sectional area and thickness, the volume of the film is $9.95\times10^{-6}cm^3$.

$Li(SO_2)_3AlCl_4$ electrolyte is prepared with anhydrous $LiAlCl_4$ (Anderson Physics) and excess dry liquid $SO_2$ (Matheson) by combining them in an evacuated Teflon cell (able to withstand pressure). After dissolution of the salt, excess $SO_2$ is slowly bled off through a bubbler containing halocarbon oil. The resultant electrolyte is between 3 and 3.5 $SO_2$ molecules per $LiAlCl_4$ molecule as measured by weight. Anhydrous LiCl is added to scavenge any excess $AlCl_3$ and ensure a neutral electrolyte. Electrolytes containing sulfuryl chloride and thionyl chloride are prepared by dissolving $LiAlCl_4$ (Anderson Physics) to form a 1.0 molar solution, then adding anhydrous LiCl to ensure solution neutrality.

Upon polymeriztion in the acetonitrile-based electrolyte, PMT is doped with $BF_4^-$ anions. Constant current discharge capacity in $Li(SO_2)_3AlCl_4$ electrolyte is improved when $BF_4^-$ dopant ions are replaced with $AlCl_4^-$ from the electrolyte. Therefore, all experiments with $Li(SO_2)_3AlCl_4$ electrolyte are performed with $AlCl_4^-$ -doped PMT. The usual method of treatment is to undope $BF_4^-$ from the polymer in $LiAlCl_4$-$3SO_2$ electrolyte by holding the potential at 3.0 V (vs lithium) and then doping $AlCl_4^-$ by charging at a constant potential of 3.8 V. Minimal electrolyte reduction would occur while undoping the polymer at 3.0 V since reduction of electrolyte occurs below this potential. After doping with $AlCl_4^-$ and then standing overnight, the cell potential equilibrates at 3.4 V. At 3.0 V, reduction of $SOCl_2$ and $SO_2Cl_2$ occurs, so polymer undoping is not possible in these electrolytes. Holding the potential at 3.8 V to force $AlCl_4^-$ doping in $SOCl_2$ electrolyte is not beneficial on subsequent discharge. Therefore, discharges in $SOCl_2$ and $SO_2Cl_2$ electrolytes are performed with $BF_4^-$ -doped polymer. OCV in these electrolytes is 3.53 and 3.83 V respectively.

To control experiments, a PAR Model 173 potentiostat/galvanostat with a model 276 plug-in interface is used in conjunction with a Hewlett Packard HP-86 computer. The experimental cell for the pulse experiments is a 125 ml European flask flooded with 20 ml of $Li(SO_2)_3AlCl_4$ electrolyte, containing a large lithium counter electrode and lithium reference.

DESCRIPTION OF THE DRAWING AND PREFERRED EMBODIMENT

Figure 5:
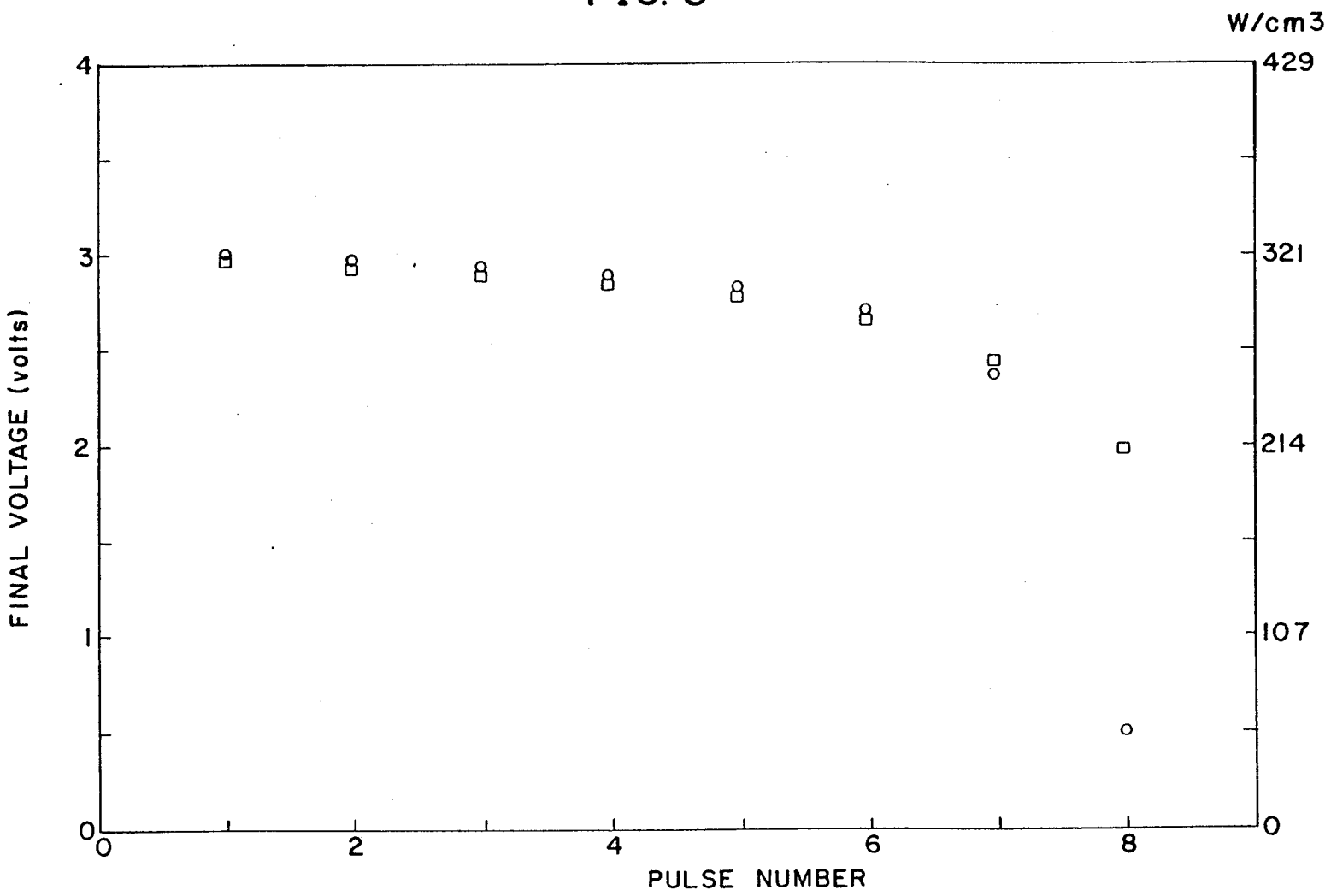

FIG. 5 shows final potential of $Li/Li(SO_2)_3AlCl_4$/1.4 μm PMT cell after each 4 second, 15 mA $cm^{-2}$ pulse with 1 s open circuit rest periods. Recharge is at 0.2 mA $cm^{-2}$ to a 3.8 V cutoff. First (square) and 21st (circle) pulse sets are shown.

Figure 6:
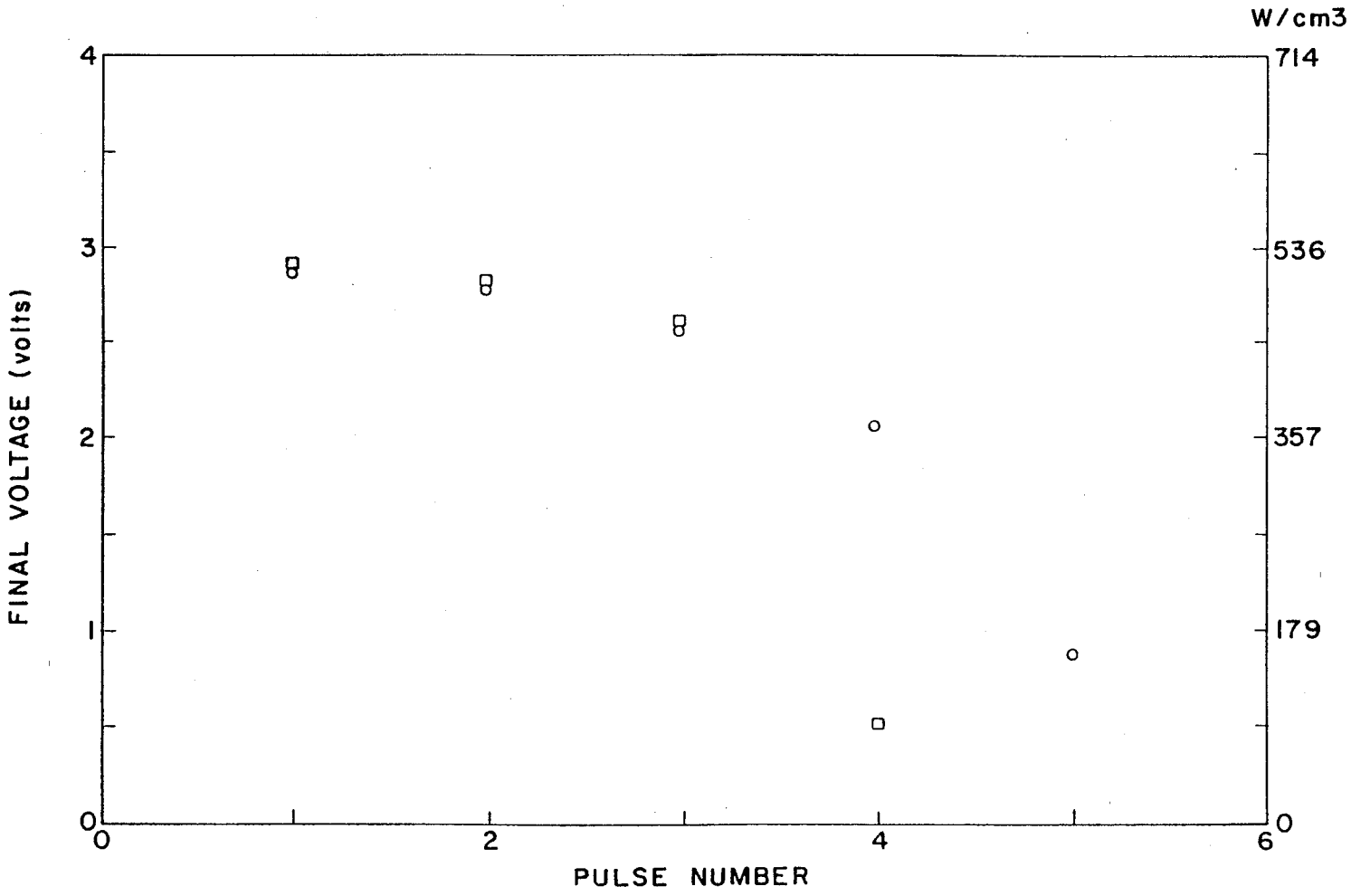

FIG. 6 shows final potential of $Li/Li(SO_2)_3AlCl_4$/1.4 μm PMT cell after each 4 second, 25 mA $cm^{-2}$ pulse with 1 s open circuit rest periods. Recharge is at 0.2 mA $cm^{-2}$ to a 3.8 V cutoff. Second (square) and 35th (circle) pulse sets are shown.

Figure 1:
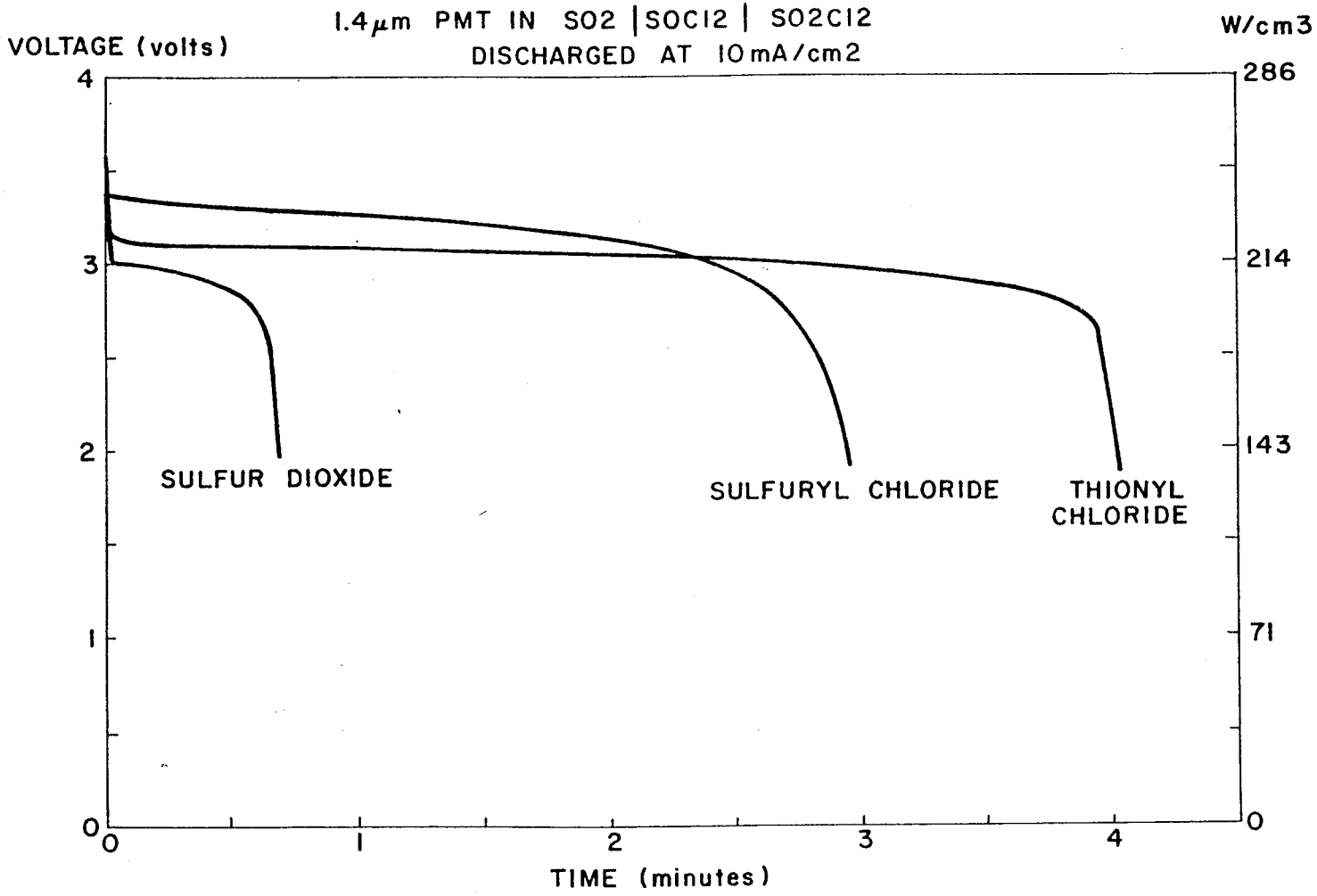
FIG. 1 shows voltage and power density as a function of discharge time at 10 mA $cm^{-2}$ constant current, for a 1.4 μm thick PMT cathode and lithium anode in either 1.0 M $LiAlCl_4$—$SOCl_2$, 1.0 M $LiAlCl_4$—$SO_2Cl_2$, or $Li(SO_2)_3AlCl_4$ electrolyte.
Figure 2:
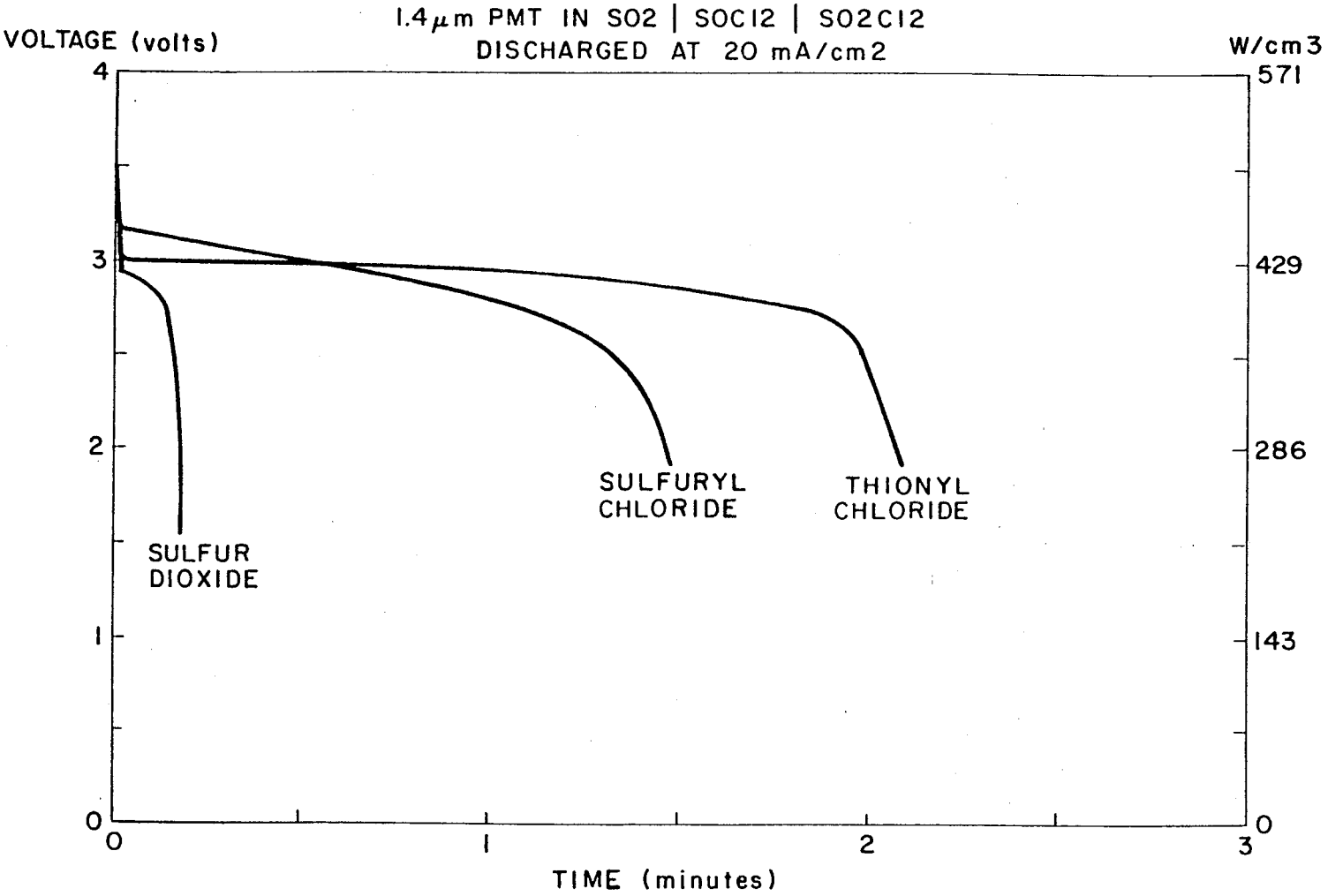
FIG. 2 shows voltage and power density as a function of discharge time at 20 mA $cm^{-2}$ constant current, for a 1.4 μm thick PMT cathode and lithium anode in either 1.0 M $LiAlCl_4$—$SOCl_2$, 1.0 M $LiAlCl_4$—$SO_2Cl_2$, or $Li(SO_2)_3AlCl_4$ electrolyte.
Figure 3:
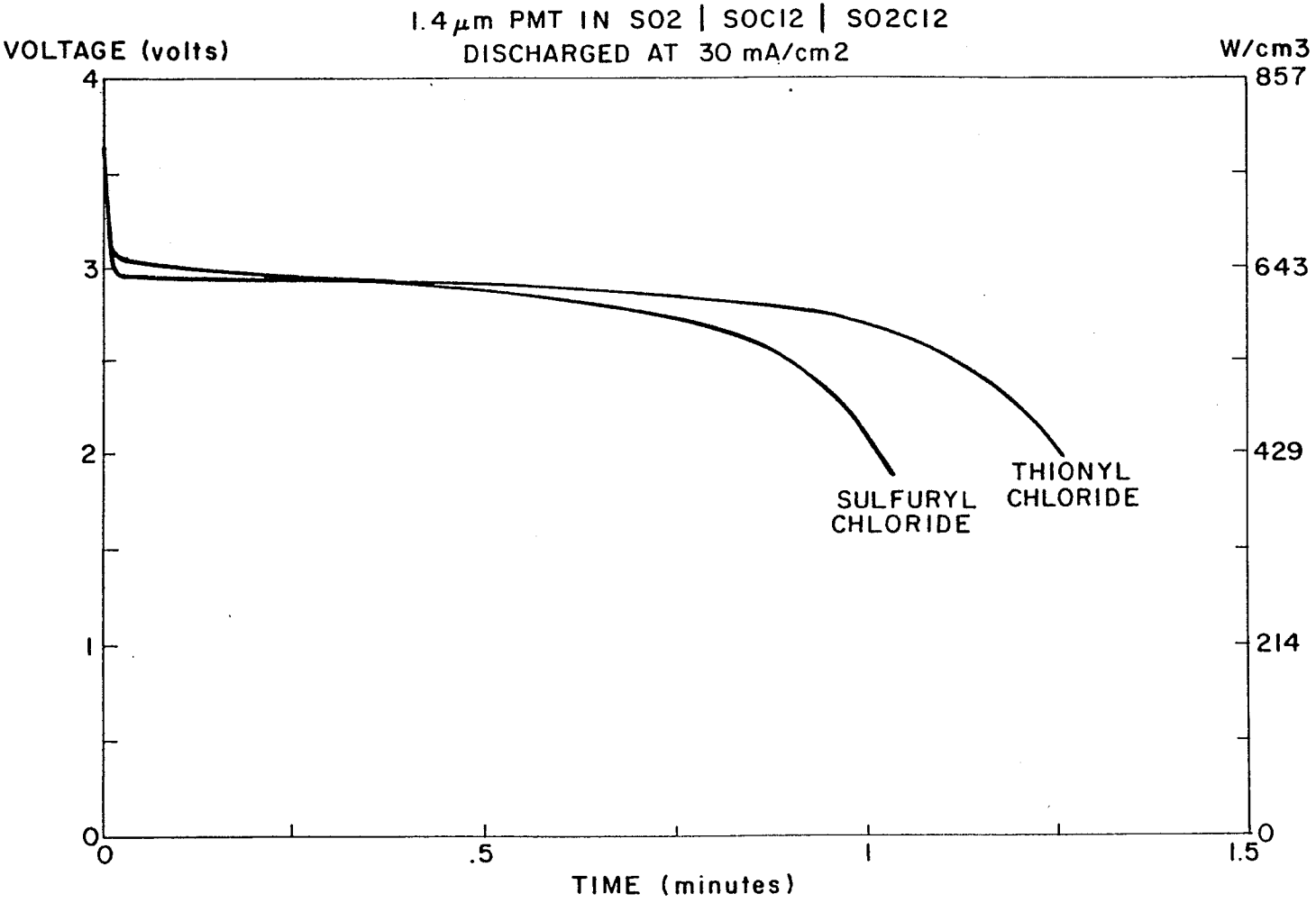
FIG. 3 shows voltage and power density as a function of discharge time at 30 mA $cm^{-2}$ constant current, for a 1.4 μm thick PMT cathode and lithium anode in either 1.0 M $LiAlCl_4$—$SOCl_2$, 1.0 M $LiAlCl_4$—$SO_2Cl_2$, or $Li(SO_2)_3AlCl_4$ electrolyte.

Constant current discharge of PMT is carried out at 10, 20 and 30 mA $cm^{-2}$. Cell potential and volumetric power density are shown in FIGS. 1-3. Lowest operating potential and shortest discharge times are observed in the sulfur dioxide based electrolyte. Although the sulfuryl chloride electrolyte initially provides the highest operating potential, the thionyl chloride based electrolyte has the longest cell capacity at all current densities. At 30 mA $cm^{-2}$, PMT can deliver about 600 W $cm^{-3}$ at a potential of 3.0 V in both sulfuryl chloride and thionyl chloride for at least 0.5 minutes. To a 2.0 V cutoff, PMT can be discharged for 1.25 minutes at power densities above 400 W $cm^{-3}$. At a lower current density of 20 mA $cm^{-2}$, PMT in thionyl chloride can be discharged for nearly 2 minutes at a 3.0 V operating potential and 429 W $cm^{-3}$ power density. By comparison, discharge in sulfur dioxide is poor. However, PMT is able to be cycled (discharged and charged) in the $SO_2$-based electrolyte.

Figure 4:
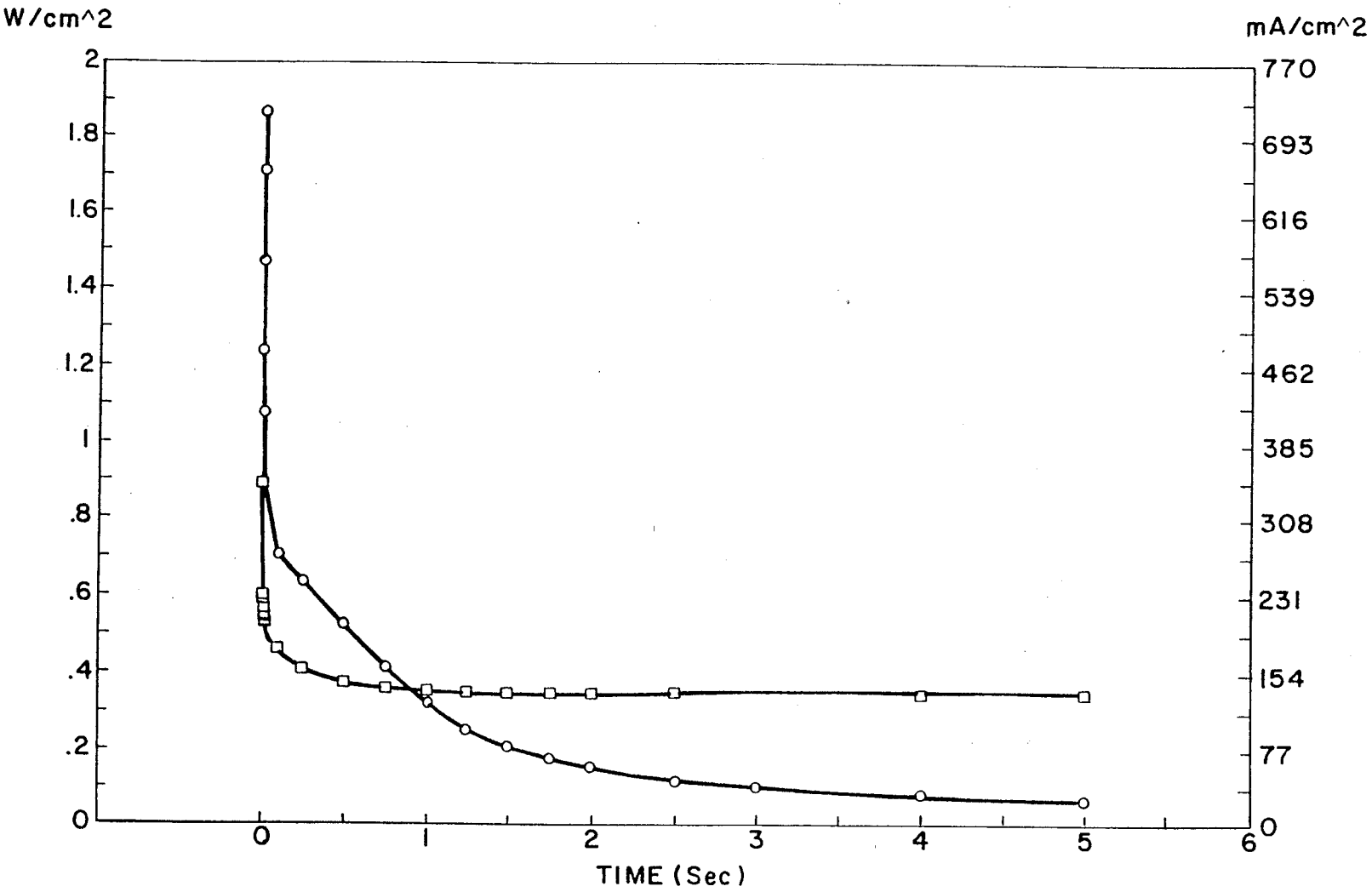
FIG. 4 shows power and current density for up to 5 s following a potential step from open circuit to 2.6 V. $Li/Li(SO_2)_3$ $AlCl_4$ cell with 1.4 μm thick PMT (circle) and 1090 μm thick PTFE-bonded 75% Sawinigan-25% Ketjen black cathode (square).

In FIG. 4, pulse power (potential step to 2.6 V) is shown for up to five seconds, whereafter 1.4 μm thick PMT delivers about 0.07 W $cm^{-2}$ (26 mA $cm^{-2}$; 489 W $cm^{-3}$). Comparison is made to a 1090 μm thick conventional PTFE-bonded porous carbon electrode, with a 75:25 mixture of Shawinigan acetylene black and Ketjen black. The area and volume of this electrode are 0.5 $cm^2$ (counting both sides of a 0.25 $cm^2$ cathode) and 0.027 $cm^3$ respectively. The polymer film provides a vast improvement in power density compared to the established Teflon-bonded porous carbon technology. The thick porous carbon electrode sustains a high current density (135 mA $cm^{-2}$) after 5 s; however, PMT delivers more power per $cm^2$ for nearly one second. On a volumetric basis, after 5 seconds, the power densities for PMT and porous carbon are 489 W $cm^{-3}$ and 6.5 W $cm^{-3}$ respectively shown in Table 1. Table 1 shows a comparison of current density and power density for 1.4 μm thick PMT and 1090 μm thick PTFE-bonded porous carbon (75% Shawinigan, 25% Ketjen black) cathodes. The $Li/Li(SO_2)_3$ $AlCl_4$/cathode cell stepped from OCV to 2.6 V. For short term pulses, PMT is superior to thicker porous carbon electrodes, and can be more easily fabricated as a bipolar stack of very thin electrodes.

TABLE 1

| TIME (sec) | PMT A $cm^{-2}$ | POROUS A $cm^{-2}$ | PMT W $cm^{-3}$ | POROUS W $cm^{-3}$ |
|---|---|---|---|---|
| 0.001 | 0.723 | 0.343 | 13369 | 16.5 |
| 0.01 | 0.479 | 0.211 | 8860 | 10.1 |
| 0.1 | 0.273 | 0.178 | 5043 | 8.56 |
| 1.0 | 0.126 | 0.138 | 2334 | 6.63 |
| 2.0 | 0.063 | 0.136 | 1166 | 6.54 |
| 3.0 | 0.041 | 0.136 | 760 | 6.54 |
| 4.0 | 0.033 | 0.135 | 606 | 6.49 |
| 5.0 | 0.026 | 0.135 | 489 | 6.49 |

The superior pulse power of PMT (compared to porous carbons) is not a result of polymer surface area (4.13 $m^2$ $g^{-1}$, measured by a one point BET surface area analysis) since carbon blacks have much greater surface areas (60-1500 $m^2$ $g^{-1}$).

Finally, PMT is also evaluated for intermittent constant current pulse power in Li $(SO_2)_3AlCl_4$ electrolyte. A constant current load is applied for four seconds, and cell potential measured at the end of this period. Following a one second rest at open circuit, the cell is pulsed again, repeating this procedure until cell potential falls below 2.0 V. Then the cell is recharged at 0.2 mA $cm^{-2}$ to a 3.8 V cutoff, after which the next cycle is begun. The potential at the end of each four second pulse is shown in FIGS. 5 and 6. In FIG. 5, PMT is pulse discharged at 15 mA $cm^{-2}$. In the first set of pulse discharges, eight pulses are obtained. After 20 cycles, the 21st set also provides eight pulses. Except for the last pulse, final potentials are remarkably similar even after 21 cycles. Final potentials during the first six pulses ranges between 3.0 on the first pulse to 2.7 V on the sixth pulse, corresponding to power densities of 321 and 289 W $cm^{-3}$ respectively. FIG. 6 shows data at a 25 mA $cm^{-2}$ rate. Here, four or five pulses are obtained for 35 cycles. The first three pulses are very reproducible, with final potentials between 2.9 and 2.6 V and power densities of 518 to 464 W $cm^{-3}$ respectively. These experiments demonstrate the ability of PMT to deliver several high power pulses over a short time period, reproducibly repeated for several cycles in $Li(SO_2)_3AlCl_4$ electrolyte.

I wish it to be understood that I do not desire to be limited to the exact details of construction shown and described for obvious modifications will occur to a person skilled in the art.

What is claimed is:

1. An electrochemical cell capable of delivering high power pulses, said electrochemical cell including poly 3-methylthiophene as the cathode, a member of the group consisting of $Li(SO_2)_3AlCl_4$, 1.0 M $LiAlCl_4$—$SOCl_2$ and 1.0 M $LiAlCl_4$ $SO_2Cl_2$ as the electrolyte and lithium as the anode.

2. An electrochemical cell according to claim 1 wherein the electrolyte is $Li(SO_2)_3AlCl_4$.

3. An electrochemical cell according to claim 1 wherein the electrolyte is 1.0 M $LiAlCl_4$—$SOCl_2$.

4. An electrochemical cell according to claim 1 wherein the electrolyte is 1.0 M $LiAlCl_4$-$SO_2Cl_2$.

5. An electrochemical cell according to claim 1 wherein the cell is rechargeable.

6. An electrochemical cell according to claim 1 wherein the poly 3-methylthiophene cathode is electrochemically formed as a thin, electrically conducting film.

* * * * *